United States Patent [19]

Ando et al.

[11] Patent Number: 5,043,212
[45] Date of Patent: Aug. 27, 1991

[54] MAGNETIC RECORDING MEDIUM

[75] Inventors: Yasuo Ando; Tsutomu Kenpo, both of Hino, Japan

[73] Assignee: Konica Corporation, Tokyo, Japan

[21] Appl. No.: 573,447

[22] Filed: Aug. 24, 1990

[30] Foreign Application Priority Data

Aug. 31, 1989 [JP] Japan .................................. 1-227125

[51] Int. Cl.$^5$ ............................................ G11B 23/00
[52] U.S. Cl. .................................... 428/336; 428/694; 428/900
[58] Field of Search ....................... 428/336, 694, 900

[56] References Cited

U.S. PATENT DOCUMENTS 4,409,281 10/1983 Kitamoto et al. .................... 428/900
4,847,147 7/1989 Aonuma et al. ..................... 428/694
4,851,289 7/1989 Ogawa et al. ....................... 428/900
4,873,129 10/1989 Fukke ................................. 428/694

Primary Examiner—Paul J. Thibodeau
Attorney, Agent, or Firm—Jordan B. Bierman

[57] ABSTRACT

A magnetic recording medium having plural magnetic layers is disclosed. The magnetic recording medium comprises a first magnetic layer containing magnetic powder having a coercive force of less than 800 Oe and a BET value of less than 45 m$^2$/g, a second magnetic layer containing magnetic powder having a coercive force of not less than 800 Oe and a BET value of less than 45 m$^2$/g and a third magnetic layer containing magnetic powder having a coercive force of not less than 800 Oe and a BET value of not less than 45 m$^2$/g, in this order.

3 Claims, 3 Drawing Sheets

MAGNETIC RECORDING MEDIUM

FIELD OF THE INVENTION

The present invention relates to a magnetic recording medium such as a magnetic tape, a magnetic sheet and a magnetic disc.

BACKGROUND OF THE INVENTION

In general, a magnetic recording medium such as a magnetic tape is produced by coating and drying a magnetic coating composition comprising a magnetic powder, a binder resin and other components on a support. In the case of a magnetic recording medium having only a single magnetic layer, it is necessary to cover a wide frequency band including low to high frequencies by means of the magnetic powder contained in the single layer. Since improvement in high frequency recording characteristic and noise reduction are demanded to increase recording density, magnetic powders having a high Hc value and a high BET value are used.

However, since conventional magnetic recording media are configured with a single magnetic layer and too much weight is laid upon high frequency characteristic, a magnetic powder having a high Hc value and a high BET value is used; therefore, the low frequency characteristic is unsatisfactory. Also, a magnetic powder having a high Hc value and a high BET value tends to fail to provide satisfactory output in Hi-Fi audio, whose the recording band is lower than that of video luminescence.

On the other hand, in the case of magnetic recording media for video use, there have been proposed media having a number of magnetic layers for the purpose of increasing magnetic recording capacity or improving magnetic recording characteristic in both the high frequency and low frequency bands of the medium to balance them (e.g., Japanese Patent Publication Open to Public Inspection Nos. 98803/1973, 172142/1984, 64901/1976, 56228/19833 and 146211/1988 and Japanese Patent Examined Publication Nos. 2218/1957 and 12937/1981).

However, even these media cannot serve well to increase all of chromatic output, video luminescence output and Hi-Fi audio output with a good balance and improve electromagnetic conversion characteristic in the entire frequency band covering high, moderate and low frequencies.

SUMMARY OF THE INVENTION

The object of the present invention is to provide a magnetic recording medium having an excellent electromagnetic conversion characteristic in the entire frequency band, specifically a magnetic recording medium which is excellent in all of video luminescence output, Hi-Fi audio output and chromatic output.

The magnetic recording medium of the present invention contains on a support the following:

(a) a first magnetic layer containing a magnetic powder having an Hc value of less than 800 Oe and a BET value of less than 45 m$^2$/g, (b) a second magnetic layer containing a magnetic powder having an Hc value of not less than 800 Oe and a BET value of less than 45 m$^2$/g and (c) a third magnetic layer containing a magnetic powder having an Hc value of not less than 800 Oe and a BET value of not less than 45 m$^2$/g in this order.

In accordance with the present invention, high density recording is possible and it is possible to improve electromagnetic conversion characteristics such as S/N ratio and output in the high frequency band, since the magnetic layer is configured with the first, second and third magnetic layers described above with the upper layer (third magnetic layer) prepared with a magnetic powder having an Hc value (coercive force) of not less than 800 Oe and a BET value (specific surface area) of not less than 45 m$^2$/g. Thus, video luminescence output can be effectively recorded and reproduced with this third magnetic layer. For the enhancement of this effect, use of a magnetic powder having an Hc value of not less than 850 Oe and a BET value of not less than 50 m$^2$/g further improves the electromagnetic conversion characteristic.

Also, concerning the second magnetic layer, a middle magnetic layer, its magnetic powder has an Hc value of not less than 800 Oe like the third magnetic layer, but the BET value is less than 45 m$^2$/g; therefore, it is possible to satisfactorily record and reproduce Hi-Fi audio signal, which corresponds to a frequency band higher than that for color luminescence, though lower than that for video luminescence. It is more preferable that the Hc value be not less than 850 Oe and the BET value be not more than 40 m$^2$/g, with recommendation that the lower limit of BET value be settled at 30 m$^2$/g.

DETAILED EXPLANATION OF THE INVENTION

Figure 1:
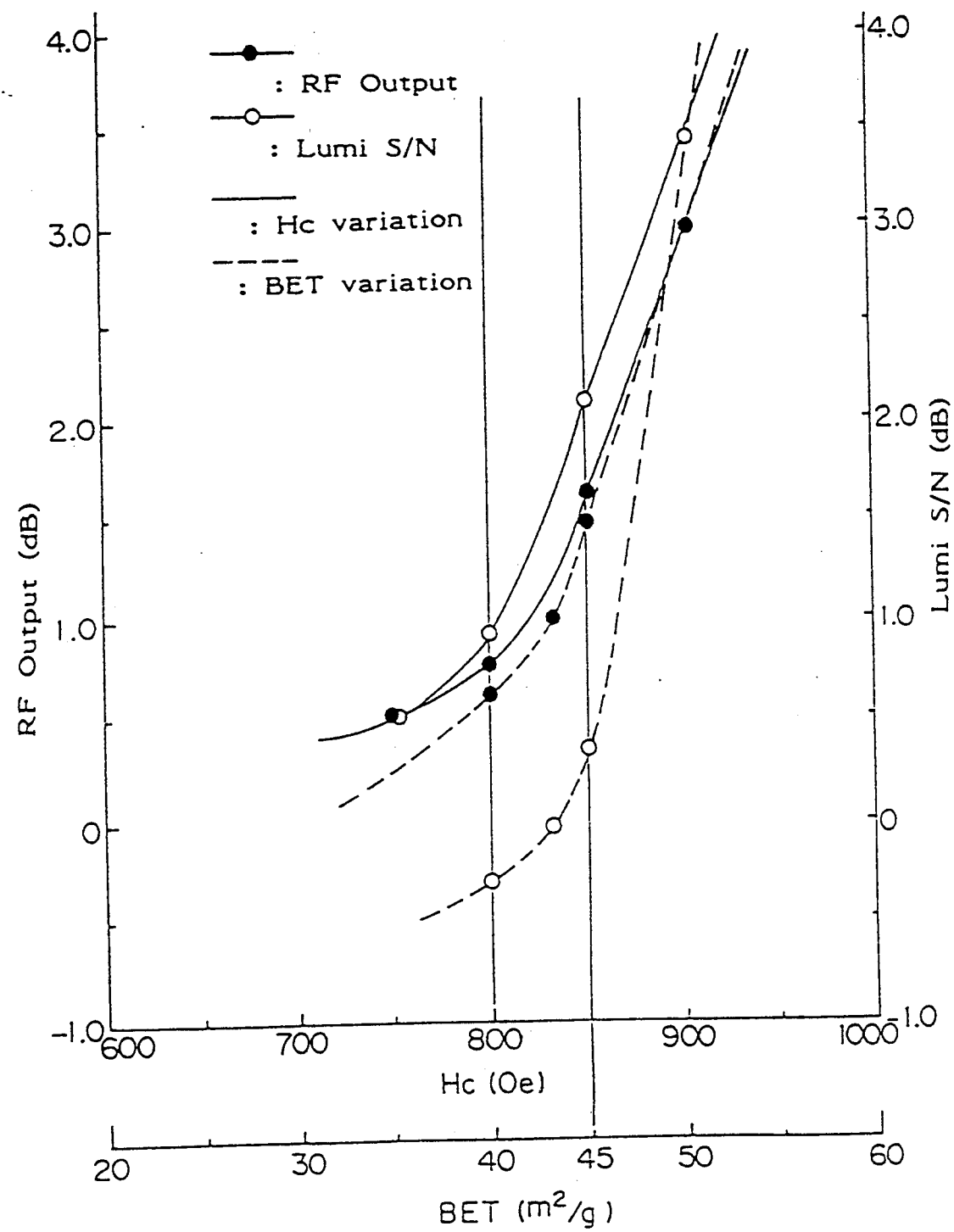
FIGS. 1, 2 and 3 are graphs showing changes in characteristics which occurred when magnetic powder physical properties were changed.

As stated above, frequency characteristics in the high and moderate frequency bands are allotted to the third and second magnetic layers, respectively, which in turn permits significant improvement in the recording and reproduction characteristics of video luminescence. For this purpose, the total thickness of the third and second magnetic layers must be small, with preference given to a thickness of not more than 1.0 μm, more preferably not more than 0.6 μm.

In addition, since a first magnetic layer containing a magnetic powder having an Hc value of less than 800 Oe and a BET value of less than 45 m$^2$/g is formed under the second magnetic layer in the present invention, the output characteristic for video chromatic, corresponding to a lower frequency band in comparison with the luminescence described above. Further improvement is achieved by reducing the Hc value to not more than 700 Oe and the BET value to not more than 40 m$^2$/g, but it is recommended that their lower limits be settled at 400 Oe and 30 m$^2$/g, respectively. Also, since the first and second magnetic layers both have a relatively low BET value and correspondingly have a relatively high grain size of magnetic powder, Young's modulus of the lower layer and thus the stiffness of the entire magnetic layer improve.

In addition, since the lower layer incorporates a magnetic powder with a relatively great grain size, dispersibility improves and it becomes easier to appropriately control the surface property of the third magnetic layer or the upper layer. It is desirable that the thickness of this first magnetic layer be 1.5 to 4.0 μm.

It is desirable that the first, second and third magnetic layers described above be in contact with each other. It should be noted, however, that any magnetic layer described above is defined as the upper or lower of two adjoining magnetic layers not including the border region where the magnetic powders of two magnetic layers coexist in a given thickness unless a clear border is substantially present therebetween. The medium of the present invention is particularly suitable to the coating of each magnetic layer by the wet-on-wet method. Of course, the wet-on-dry method is acceptable, wherein the upper layer is coated after drying the lower layer.

Also, each of the magnetic layers described above may be separate in a number of portions. For example, the first magnetic layer may be formed in two separate portions, i.e., a lower portion having an Hc value of 700 to 750 Oe and a BET value of 35 to 40 $m^2/g$ and an upper portion having an Hc value of 750 to 800 Oe and a BET value of 40 to 45 $m^2/g$. In this case, the border region as described above is included in any magnetic layer.

BET value is defined as surface area per unit weight. This value represents a physical quantity different from average grain size. For example, grains with the same average grain size may include those having a greater specific surface area and those having a smaller specific surface area. Specific surface area measurements are made, for example, by degassing the subject powder for 30 to 60 minutes while heating at about 250° C. to remove the substances adsorbed thereto, then introducing it into a measuring apparatus, and determining the adsorption at a temperature of $-195°$ C. maintained with liquid nitrogen at an initial nitrogen pressure of 0.5 $kg/m^2$ [a specific surface area determination method generally called the BET method; refer to J. Ame. Chem. Soc. 60, 309 (1938)]. Usable measuring apparatuses for this specific surface area (BET value) include the "powder particle measuring apparatus Quantasorb", produced by Yuasa Battery Co., Ltd. and Yuasa Ionics Co., Ltd. General description of specific surface area and methods of its determination is given in detail in "Measurements of Particles" (edited by J. M. Dallavalle and Clydeorr Jr., translated into Japanese by Muta et al., published by Sangyo Tosho Co.). Description is also given in "Kagaku Binran-Applications", pp. 1170–1171, edited by the Chemical Society of Japan, published by Maruzen Co., Ltd., Apr. 30, 1966). (In the above-mentioned reference "Kagaku Binran", specific surface area is simply referred to as surface area ($m^2/gr$), but which is identical to specific surface area defined in the present specification.)

The magnetic recording medium of the present invention comprises a first magnetic layer, a second magnetic layer and a third magnetic layer laminated on a nonmagnetic support comprising polyethylene terephthalate or another material in this order. Also, a backcoat layer 3 is formed on the support face opposite to the lamination face, but it is not essential. An overcoat layer may be formed on the second magnetic layer.

In the magnetic recording medium, it is preferable that the first magnetic layer have a thickness of 1.5 to 4.0 μm, the second magnetic layer have a thickness of 0.1 to 0.9 μm and the third magnetic layer have a thickness of 0.1 to 0.9 μm.

The first through third magnetic layers incorporate a magnetic powder. Examples of magnetic powders used in these magnetic layers include magnetic powders of iron oxides such as $\gamma$-$Fe_2O_3$, Co-containing $\gamma$-$Fe_2O_3$, $Fe_3O_4$ and Co-containing $Fe_3O_4$; and ferromagnetic powders of metals such as Fe, Ni and Co, and of alloys consisting mainly of Fe, Ni, Co or other metals, such as Fe-Ni-Co alloys, Fe-Ni alloys, Fe-Al alloys, Fe-Al-Ni alloys, Fe-Al-Co alloys, Fe-Mn-Zn alloys, Fe-Ni-Zn alloys, Fe-Al-Ni-Co alloys, Fe-Al-Ni-Cr alloys, Fe-Al-Co-Cr alloys, Fe-Co-Ni-Cr alloys, Fe-Co-Ni-P alloys and Co-Ni alloys.

Out of these magnetic powders, those having an Hc value and BET value suitable to each of the magnetic layers described above can be selected in accordance with the present invention.

Each magnetic layer may be formulated with a lubricant (e.g., silicone oil), graphite, molybdenum disulfide, tungsten disulfide, a monobasic fatty acid with a carbon number of 12 to 20 (e.g., stearic acid), a fatty acid ester having a total carbon number of 13 to 40, a polishing agent (e.g., fused alumina), an antistatic agent (e.g., carbon black, graphite) and other additives.

The binder used for magnetic layers preferably has an average molecular weight of about 10000 to 200000. Examples of such binders include vinyl chloride-vinyl acetate copolymers, vinyl chloride-vinylidene chloride copolymers, vinyl chloride-acrylonitrile copolymers, polyvinyl chloride, urethane resin, butadiene-acrylonitrile copolymers, polyamide resin, polyvinyl butyral, cellulose derivatives (e.g., cellulose acetate butyrate, cellulose diacetate, cellulose triacetate, cellulose propionate, nitrocellulose), styrene-butadiene copolymers, polyester resin, various synthetic rubbers, phenol resin, epoxy resin, urea resin, melamine resin, phenoxy resin, silicon resin, acrylic reactive resin, high polymer polyester resin/isocyanate prepolymer mixtures, polyester polyol/polyisocyanate mixtures, urea formaldehyde resin, low molecular glycol/high molecular diol-/isocyanate mixtures, and mixtures thereof.

Of these binders, preference is given to resins having a hydrophilic polar group such as $-SO_3M$, $-COOM$, $-PO(OM')_2$ (wherein M represents hydrogen or an alkali metal such as lithium, potassium or sodium; M' represents hydrogen, an alkali metal such as lithium, potassium or sodium or a hydrocarbon residue. These resins are highly compatible with magnetic powder due to the action of the polar group in their molecule, which permits further improvement in magnetic powder dispersibility and prevention of magnetic powder coagulation, which leads to improvement in coating solution stability and improvement in medium durability.

These binders, particularly vinyl chloride copolymers, can be obtained by copolymerizing a vinyl chloride monomer, a copolymerizable monomer containing an alkali salt of sulfonic acid or phosphoric acid, and if needed, another copolymerizable monomer. This copolymer is easy to synthesize by vinyl synthesis, and in addition, it is possible to select any copolymerization components from a wide variety of substances, which permits optimization of copolymer properties.

The metal for the salts of sulfonic acid or phosphoric acid described above is an alkali metal (particularly sodium, potassium, lithium), with preference given to potassium from the viewpoint of solubility, reactivity, yield and other aspects.

In forming a backcoat layer, the binder described above is formulated with nonmagnetic grains such as those of barium sulfate, and the backcoat layer is formed on the back face of a support.

Examples of the material for the support described above include plastics such as polyethylene terephthalate and polypropylene; metals such as Al and Zn; and ceramics such as glass, boron nitride, Si carbide, porcelain and earthenware.

An example production apparatus for the medium described above is explained.

In this production apparatus, the film support, pushed out from feed roll is first coated with the paints respectively for the magnetic layers described above by extrusion coaters, then oriented by, for example, a 2000 Gauss front stage orientation magnet, then introduced into drier equipped with, for example, a 2000 Gauss back stage orientation magnet, where it is dried with hot air blown from nozzles arranged above and under the drier. Support, now already coated with each dried coating layer, is introduced into supercalendering apparatus, comprising a combination of a number of units of calender roll, where it is calendered, after which it is wound by winding roll. Each paint may be fed to extrusion coaters through an inline mixer. Extrusion coaters are equipped with liquid reservoirs respectively, and the coating compositions supplied by the coaters are superposed by the wet-on-wet method.

The present invention is hereinafter described in more detail by means of the following examples.

The components, ratios, operational orders and other aspects shown below are widely variable, as long as they remain within the scope of the present invention. Note that "part(s)" appearing in the following examples are part(s) by weight without exception.

The compositions shown in Table 1 below were first each kneaded and dispersed to yield respective magnetic coating compositions.

TABLE 1

| Coating composition | Magnetic layer | | |
|---|---|---|---|
| | Third layer | Second layer | First layer |
| Co-γ-Fe$_2$O$_3$ | 100 parts, listed in Table 2 | 100 parts, listed in Table 2 | 100 parts, listed in Table 2 |
| Vinyl chloride copolymer | 10 parts | 10 parts | 10 parts |
| Polyurethane resin | 7 parts | 7 parts | 7 parts |
| α-Al$_2$O$_3$ | 7 parts | Not added | Not added |
| Stearic acid | 1 part | 1 part | 1 part |
| Butyl stearate | 1 part | 1 part | 1 part |
| Cyclohexanone | 200 parts | 200 parts | 200 parts |
| Methyl ethyl ketone | 100 parts | 100 parts | 100 parts |
| Toluene | 100 parts | 100 parts | 100. parts |
| Carbon black | 1 part | Not added | Not added |

TABLE 1-continued

| Coating composition | Magnetic layer | | |
|---|---|---|---|
| | Third layer | Second layer | First layer |
| Polyisocyanate | 3 parts | 3 parts | 3 parts |

Note:
Co-γ-Fe$_{23}$ means a Co-containing or Co-adhering γ-Fe$_2$O$_3$; the vinyl chloride copolymer contains —SO$_3$K (MR110, producted by Nippon Zeon Co., Ltd.); the polyurethane resin contains in its molecular structure the following:

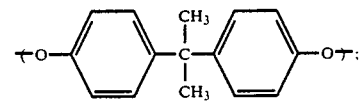

and the polyisocyanate is Coronate L (produced by Nippon Polyurethane Industry Co., Ltd.).

These magnetic coating compositions were each discharged using the extrusion coaters, and magnetic layers were coated on a polyethylene terephthalate base of 14 μm in thickness to reach the film thicknesses shown in Table 2. After orientation and drying, supercalendering was carried out. Then, the following backcoat paint composition was coated on the face opposite to the magnetic layer face to reach a dry thickness of 1.0 μm.

| | |
|---|---|
| Carbon black (average grain size 20 μm) | 40 parts |
| Carbon black (average grain size 300 μm) | 5 parts |
| Nitrocellulose (Celnova BTH ½, produced by Asahi Chemical Industry Co., Ltd) | 25 parts |
| N-2301 (produced by Nippon Polyurethane Industry Co., Ltd.) | 25 parts |
| Coronate L (produced by Nippon Polyurethane Industry Co., Ltd.) | 10 parts |
| Cyclohexanone | 400 parts |
| Methyl ethyl ketone | 250 parts |
| Toluene | 250 parts |

Broad magnetic films were thus obtained. These films were each cut into a 0.5 inch wide video tape. Each tape was evaluated as to the following performance items. The results are shown in Table 2.

(a) RF-output, luminescence-S/N, chromatic-AM-S/N, chromatic-output

Determined using a color video noise meter (Shibasoku 925 D/1) and the HR-S7000 deck, produced by Victor Company of Japan, Ltd. The data are expressed in ralative values (dB) to the data obtained with a reference tape.

The frequency of each signal was as follows:
RF-output: 6 MHz
Luminescence-S/N: 6 MHz
Chromatic AM S/N: 629 KHz
Chromatic-output: 629 KHz (b) Hi-Fi audio output Determined using the HR-S7000 deck, produced by Victor Company of Japan, Ltd. The data are expressed in ralative values (dB) to the data obtained with a reference tape.

The frequency of this output signal was 1.3 MHz.

TABLE 2

| | Third layer | | | Second layer | | | First layer | | |
|---|---|---|---|---|---|---|---|---|---|
| | Hc (Oe) | BET (m$^2$/g) | Film thickness (μm) | Hc (Oe) | BET (m$^2$/g) | Film thickness (μm) | Hc (Oe) | BET (m$^2$/g) | Film thickness (μm) |
| Example 1 | 900 | 50 | 0.2 | 900 | 40 | 0.3 | 700 | 40 | 2.0 |
| Example 2 | 850 | 50 | 0.2 | 900 | 40 | 0.3 | 700 | 40 | 2.0 |
| Example 3 | 900 | 46 | 0.2 | 900 | 40 | 0.3 | 700 | 40 | 2.0 |

TABLE 2-continued

| | | | | | | | | | |
|---|---|---|---|---|---|---|---|---|---|
| Example 4 | 900 | 50 | 0.2 | 850 | 40 | 0.3 | 700 | 40 | 2.0 |
| Example 5 | 900 | 50 | 0.2 | 900 | 43 | 0.3 | 700 | 40 | 2.0 |
| Example 6 | 900 | 50 | 0.2 | 900 | 40 | 0.3 | 750 | 40 | 2.0 |
| Example 7 | 900 | 50 | 0.2 | 900 | 40 | 0.3 | 700 | 43 | 2.0 |
| Example 8 | 900 | 50 | 0.3 | 900 | 40 | 0.2 | 700 | 40 | 2.0 |
| Example 9 | 900 | 50 | 0.2 | 900 | 40 | 0.2 | 700 | 40 | 2.0 |
| Example 10 | 850 | 50 | 0.2 | 850 | 40 | 0.3 | 700 | 40 | 2.0 |
| Example 11 | 850 | 50 | 0.2 | 900 | 43 | 0.3 | 700 | 40 | 2.0 |
| Example 12 | 900 | 46 | 0.2 | 850 | 40 | 0.3 | 700 | 40 | 2.0 |
| Example 13 | 900 | 46 | 0.2 | 900 | 43 | 0.3 | 700 | 40 | 2.0 |
| Example 14 | 850 | 46 | 0.2 | 850 | 43 | 0.3 | 700 | 40 | 2.0 |
| Example 15 | 850 | 46 | 0.2 | 850 | 43 | 0.3 | 750 | 40 | 2.0 |
| Example 16 | 850 | 46 | 0.2 | 850 | 43 | 0.3 | 750 | 43 | 2.0 |
| Example 17 | 900 | 50 | 0.3 | 900 | 40 | 0.4 | 700 | 40 | 2.0 |
| Example 18 | 900 | 50 | 0.2 | 900 | 40 | 0.5 | 700 | 40 | 2.0 |
| Example 19 | 900 | 50 | 0.2 | 900 | 40 | 0.7 | 700 | 40 | 2.0 |
| Comparative Example 1 | 750 | 50 | 0.2 | 900 | 40 | 0.3 | 700 | 40 | 2.0 |
| Comparative Example 2 | 900 | 43 | 0.2 | 900 | 40 | 0.3 | 700 | 40 | 2.0 |
| Comparative Example 3 | 900 | 50 | 0.2 | 750 | 40 | 0.3 | 700 | 40 | 2.0 |
| Comparative Example 4 | 900 | 50 | 0.2 | 900 | 46 | 0.3 | 700 | 40 | 2.0 |
| Comparative Example 5 | 900 | 50 | 0.2 | 900 | 40 | 0.3 | 850 | 40 | 2.0 |
| Comparative Example 6 | 900 | 50 | 0.2 | 900 | 40 | 0.3 | 700 | 46 | 2.0 |
| Comparative Example 7 | 750 | 50 | 0.2 | 750 | 40 | 0.3 | 700 | 40 | 2.0 |
| Comparative Example 8 | 750 | 50 | 0.2 | 900 | 46 | 0.3 | 700 | 40 | 2.0 |
| Comparative Example 9 | 900 | 43 | 0.2 | 750 | 40 | 0.3 | 700 | 40 | 2.0 |
| Comparative Example 10 | 900 | 43 | 0.2 | 900 | 46 | 0.3 | 700 | 40 | 2.0 |
| Comparative Example 11 | 750 | 43 | 0.2 | 750 | 46 | 0.3 | 700 | 40 | 2.0 |
| Comparative Example 12 | 750 | 43 | 0.2 | 750 | 46 | 0.3 | 850 | 40 | 2.0 |
| Comparative Example 13 | 750 | 43 | 0.2 | 750 | 46 | 0.3 | 850 | 46 | 2.0 |
| Comparative Example 14 | 900 | 50 | 3.0 | | | | | | First layer was not formed. |
| Comparative Example 15 | 850 | 50 | 3.0 | | | | | | First layer was not formed. |
| Comparative Example 16 | 900 | 46 | 3.0 | | | | | | First layer was not formed. |
| Comparative Example 17 | 900 | 50 | 0.5 | Second layer was not formed. | | | 700 | 40 | 2.0 |
| Comparative Example 18 | 850 | 50 | 0.5 | Second layer was not formed. | | | 700 | 40 | 2.0 |
| Comparative Example 19 | 900 | 46 | 0.5 | Second layer was not formed. | | | 700 | 40 | 2.0 |

| | RF-output (dB) | Luminescence-S/N (dB) | Chromatic-output (dB) | Chromatic-AM-S/N (dB) | Hi-Fi audio output (dB) |
|---|---|---|---|---|---|
| Example 1 | 3.0 | 3.5 | 3.0 | 3.0 | 3.0 |
| Example 2 | 2.9 | 3.4 | 3.3 | 3.0 | 3.2 |
| Example 3 | 3.2 | 3.0 | 3.3 | 2.8 | 3.3 |
| Example 4 | 3.0 | 3.5 | 3.2 | 3.0 | 3.3 |
| Example 5 | 3.0 | 3.6 | 2.8 | 3.2 | 2.7 |
| Example 6 | 3.0 | 3.5 | 2.7 | 3.0 | 3.0 |
| Example 7 | 3.0 | 3.6 | 2.7 | 3.3 | 3.0 |
| Example 8 | 3.5 | 3.6 | 2.8 | 3.1 | 2.6 |
| Example 9 | 3.0 | 3.2 | 3.6 | 2.9 | 3.4 |
| Example 10 | 2.9 | 3.4 | 3.5 | 3.0 | 3.5 |
| Example 11 | 2.9 | 3.5 | 3.1 | 3.2 | 2.9 |
| Example 12 | 3.2 | 3.0 | 3.5 | 2.8 | 3.5 |
| Example 13 | 3.2 | 3.1 | 3.1 | 3.0 | 2.9 |
| Example 14 | 3.1 | 3.0 | 3.6 | 3.0 | 3.4 |
| Example 15 | 3.1 | 3.0 | 3.3 | 3.0 | 3.4 |
| Example 16 | 3.1 | 3.1 | 3.0 | 3.3 | 3.4 |
| Example 17 | 3.0 | 3.5 | 2.7 | 2.5 | 2.5 |
| Example 18 | 3.0 | 3.4 | 2.8 | 2.5 | 2.5 |
| Example 19 | 3.0 | 3.5 | 2.7 | 2.5 | 2.5 |
| Comparative Example 1 | 0.5 | 0.5 | 5.5 | 1.0 | 5.0 |
| Comparative Example 2 | 1.0 | 0 | 5.0 | 0.5 | 5.0 |
| Comparative Example 3 | 1.5 | 3.5 | 4.0 | 3.0 | 4.0 |
| Comparative Example 4 | 3.0 | 3.6 | 2.5 | 3.5 | 1.5 |
| Comparative Example 5 | 3.0 | 3.5 | 1.5 | 3.0 | 2.0 |
| Comparative Example 6 | 3.0 | 3.6 | 1.5 | 3.5 | 2.0 |
| Comparative Example 7 | −0.5 | 0.5 | 6.5 | 1.0 | 6.0 |
| Comparative Example 8 | 0.5 | 0.6 | 5.0 | 1.5 | 3.5 |
| Comparative Example 9 | 0.5 | 0 | 6.0 | 0.5 | 6.0 |
| Comparative Example 10 | 1.0 | 0.1 | 4.5 | 1.0 | 3.5 |
| Comparative Example 11 | −1.0 | −1.0 | 7.0 | −0.5 | 6.5 |
| Comparative Example 12 | −1.0 | −1.0 | 5.5 | −0.5 | 6.5 |
| Comparative Example 13 | −1.0 | −0.9 | 4.0 | 0 | 6.5 |
| Comparative Example 14 | 3.5 | 3.6 | 1.0 | 2.5 | 1.5 |
| Comparative Example 15 | 3.0 | 3.5 | 1.5 | 2.5 | 2.0 |
| Comparative Example 16 | 3.0 | 3.0 | 2.0 | 2.0 | 2.0 |
| Comparative Example 17 | 3.0 | 3.5 | 2.5 | 2.5 | 2.2 |
| Comparative Example 18 | 2.5 | 3.0 | 2.7 | 2.3 | 2.5 |
| Comparative Example 19 | 2.7 | 2.7 | 2.9 | 2.0 | 2.5 |

From these results, the following are evident.

(1) As shown in Examples 1 through 16, output and S/N show significant improvement over the entire frequency band by configuring the magnetic layer with three separate layers and adjusting the Hc and BET values of the magnetic powder of each layer in the range of the present invention.

(2) On the other hand, if any of the upper, middle and lower layers falls out of the range of the present invention, characteristic deterioration occurs in the high, moderate or low frequency band, respectively, as in Comparative Examples 1, 2, 3, 4, 5 and 6.

(3) If two or more of the upper, middle and lower layers fall out of the range of the present invention, characteristic deterioration becomes significant as in Comparative Examples 7, 8, 9, 10, 11, 12 and 13.

(4) The absence of middle and lower layers causes deterioration in the middle and low frequency bands as in Comparative Examples 14, 15 and 16. The absence of middle layer alone causes deterioration in the middle frequency band as in Comparative Examples 17, 18 and 19.

(5) With respect to the upper and middle layers, there is a preferred range of total film thickness. In Examples 17, 18 and 19, generally a relatively low value is obtained in the middle and low frequency bands, since the total film thickness exceeds 0.6 μm. It is desirable that the total film thickness be not more than 0.6 μm.

Figure 2:
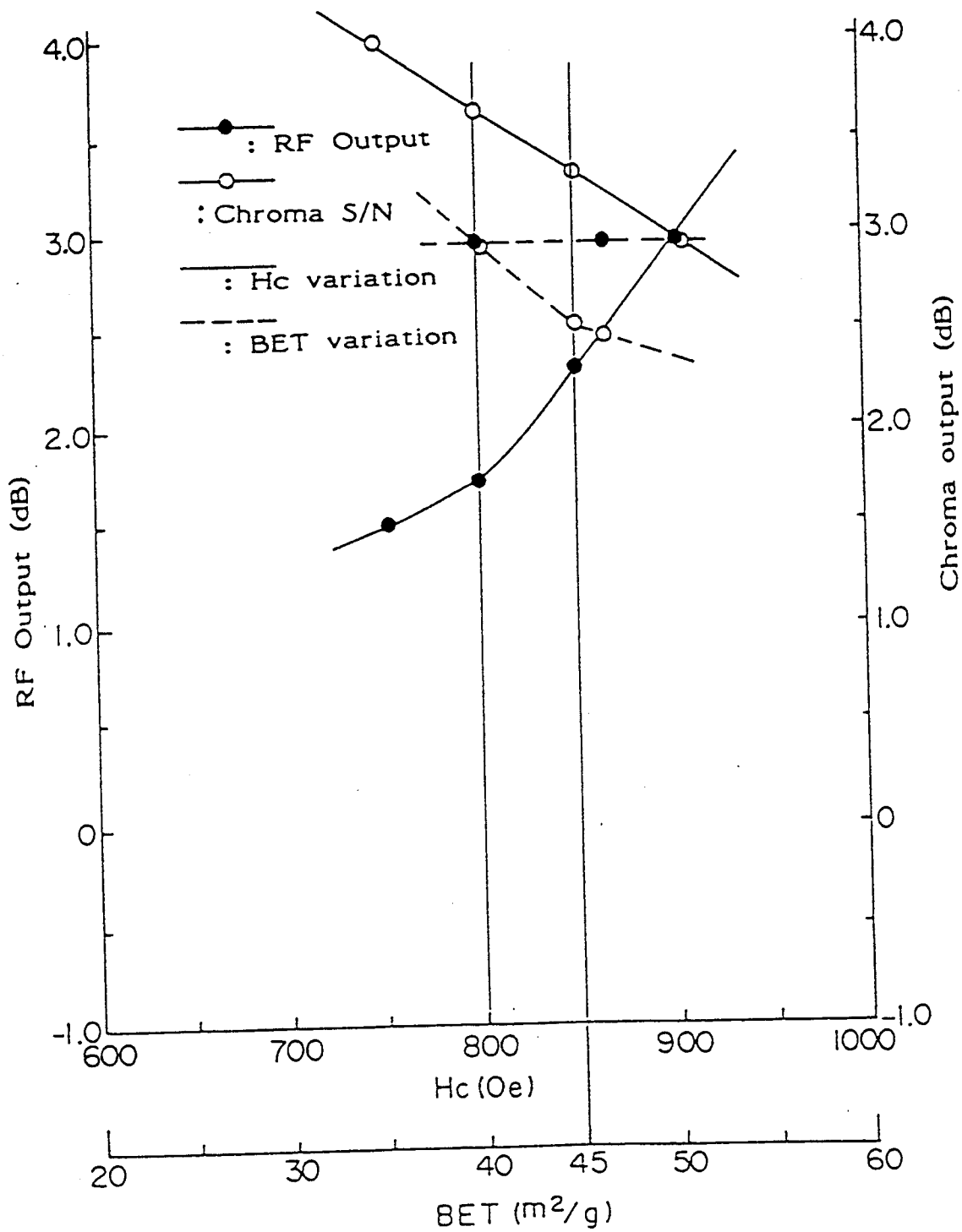
Figure 3:
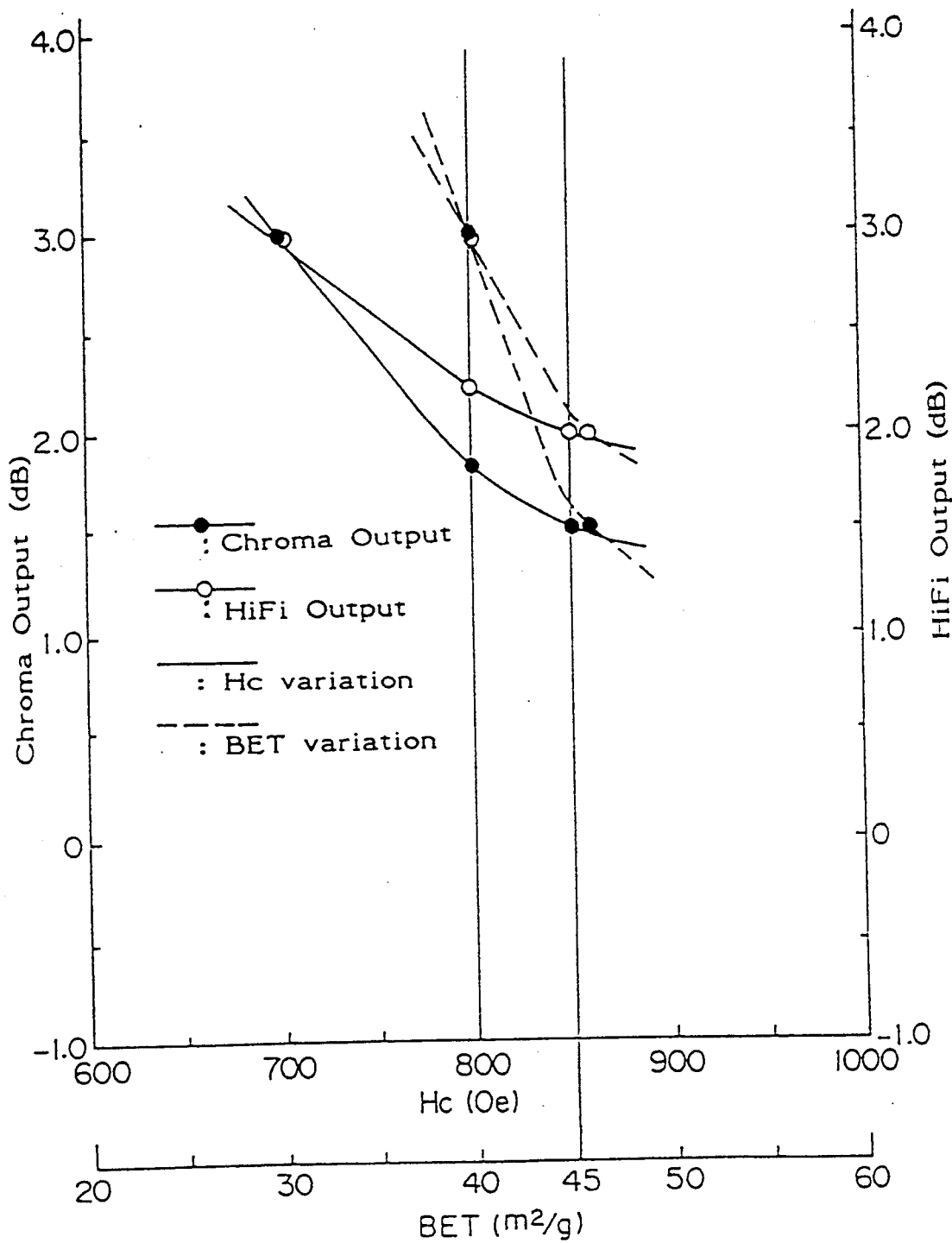

The results obtained with varied Hc or BET values in the upper layer are shown in FIG. 1. The results obtained with varied Hc or BET values in the middle layer are shown in FIG. 2. The results obtained with varied Hc or BET values in the lower layer are shown in FIG. 3.

From the results shown in FIG. 1, it is evident that the Hc of the upper layer should be not less than 800 Oe and the BET value should be not less than 45 $m^2/g$.

From the results shown in FIG. 2, it is evident that the Hc of the middle layer should be not less than 800 Oe and the BET value should be less than 45 $m^2/g$. From the results shown in FIG. 3, it is evident that the Hc of the upper layer should be less than 800 Oe and the BET value should be less than 45 $m^2/g$.

In Example 19, the same procedure as in Example 1 was followed, except that the binder for the magnetic layer was changed to a polyurethane containing a sodium sulfonate group (UR8300, produced by Toyobo Co., Ltd.). In this example, some performance items showed improvements due to improvement in magnetic powder dispersibility.

What is claimed is:

1. A magnetic recording medium having a support and provided thereon,
    a first magnetic layer containing magnetic powder having a coercive force of less than 800 Oe and a BET value of less than 45 $m^2/g$,
    a second magnetic layer containing magnetic powder having a coercive force of not less than 800 Oe and a BET value of less than 45 $m^2/g$, and
    a third magnetic layer containing magnetic powder having a coercive force of not less than 800 Oe and a BET value of not less than 45 $m^2/g$, in this order.

2. A magnetic recording medium according to claim 1, wherein total thickness of the second and the third magnetic layers is not more than 1.0 μm.

3. A magnetic recording medium according to claim 2, wherein thickness of the first magnetic layers is 1.5 to 4.0 μm.

* * * * *